(No Model.)

J. RAU.
SPROCKET CHAIN.

No. 548,591. Patented Oct. 22, 1895.

Witnesses
Roer B. Rolf
Michael Marso

John Rau
Inventor.

By Attorney John E. Salisbury

UNITED STATES PATENT OFFICE.

JOHN RAU, OF CHICAGO, ILLINOIS, ASSIGNOR OF TWO-THIRDS TO JOHN E. SALISBURY AND FRANK L. SALISBURY, OF SAME PLACE.

SPROCKET-CHAIN.

SPECIFICATION forming part of Letters Patent No. 548,591, dated October 22, 1895.

Application filed March 2, 1895. Serial No. 540,365. (No model.)

*To all whom it may concern:*

Be it known that I, JOHN RAU, a citizen of the United States, residing at Chicago, in the county of Cook and State of Illinois, have invented a new and useful Improvement in Sprocket-Chains, of which the following is a specification, reference being had to the accompanying drawings, showing a part thereof.

The principal object of this invention is to provide a chain or belt which will more effectually transmit motion and power from one gear to another, combining, also, decreased weight, protection to the sprockets of the wheel from dust accumulations, less friction, and the retention of motion heretofore lost by sprocket-chains.

To obtain these results, my invention consists of a longitudinal integral strip or band of steel or other metal with the ends rigidly or pivotally connected, preferably pivotally. This metal chain or belt is perforated with rectangular openings equidistant from each other coincident with the sprockets of the wheel. The metal formerly occupying these rectangular openings is not removed from the strip of metal, but by applied force it is pressed outward from the plane of the metal, forming an arched covering or guard for the opening. These openings or guards are so constructed that they form a close-fitting receptacle for the sprockets of the wheel. The rotary movement of the wheel presses the sprockets against the anterior edge of the opening, giving to the chain a movement similar to that of all sprocket-chains.

Figure 1:
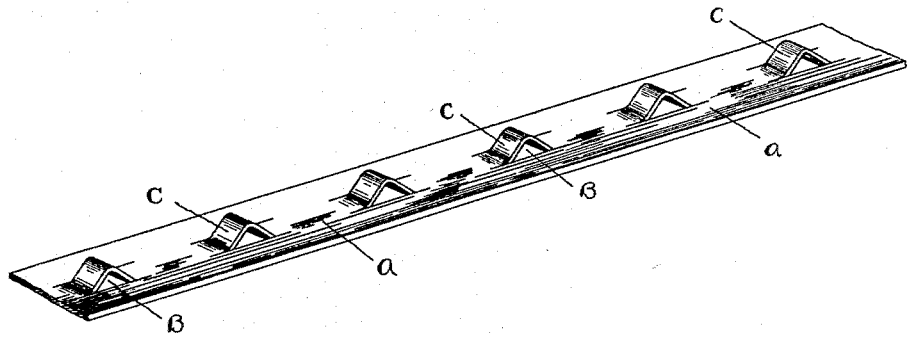
Figure 2:
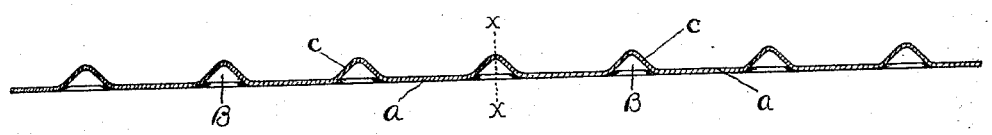
Figure 3:
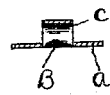

In the accompanying drawings, Figure 1 represents a perspective view of a portion of the chain. Fig. 2 is a longitudinal section of the same. Fig. 3 is a transverse section taken on line $x\,x$ of Fig. 2.

The reference-letter $a$ indicates the metal strip of chain, to be preferably of the best resilient steel in the proportions that may be required.

The openings $b$ are rectangular in form, and correspond in number and proportions to the sprockets of the wheel with which the chain is to be used.

$c$ indicates the guard, which is an integral part of the metal chain. This guard is pressed outward from the plane of the metal, leaving a rectangular opening $b$, over which it forms the arched covering or guard $c$. These guards $c$ and perforations or openings $b$ being proportionate in dimensions and coincident with the sprockets of the wheel form receptacles which receive and relinquish the sprockets with the rotary motion of the wheel. The ends of this chain may be connected rigidly by rivets or pivotally, preferably the latter. This chain may be used with all sprocket-wheels by adapting its proportions to the proportions of the wheel. It is specially adapted to the propelling mechanism of bicycles.

Having described my invention, what I claim, and desire to secure by Letters Patent of the United States, is—

1. A sprocket chain or belt consisting of a strip of resilient steel or other metal, having rectangular perforations or openings, equidistant from each other, guarded by an arched covering which prevents dust accumulations.

2. A chain consisting of a continuous band of steel or other metal, and provided with openings, each guarded by an arched covering integral with the band.

February 26, 1895.

JOHN RAU.

Witnesses:
 ROSE B. ROLF,
 A. A. ROLF.